Nov. 6, 1928.　　　　　　　　　　　　　　　　1,690,623
P. DE MATTIA
COLLAPSIBLE CORE
Filed Oct. 16, 1924　　　　3 Sheets-Sheet 1

WITNESSES

INVENTOR
Peter DeMattia
BY
ATTORNEYS

Nov. 6, 1928.
P. DE MATTIA
COLLAPSIBLE CORE
Filed Oct. 16, 1924
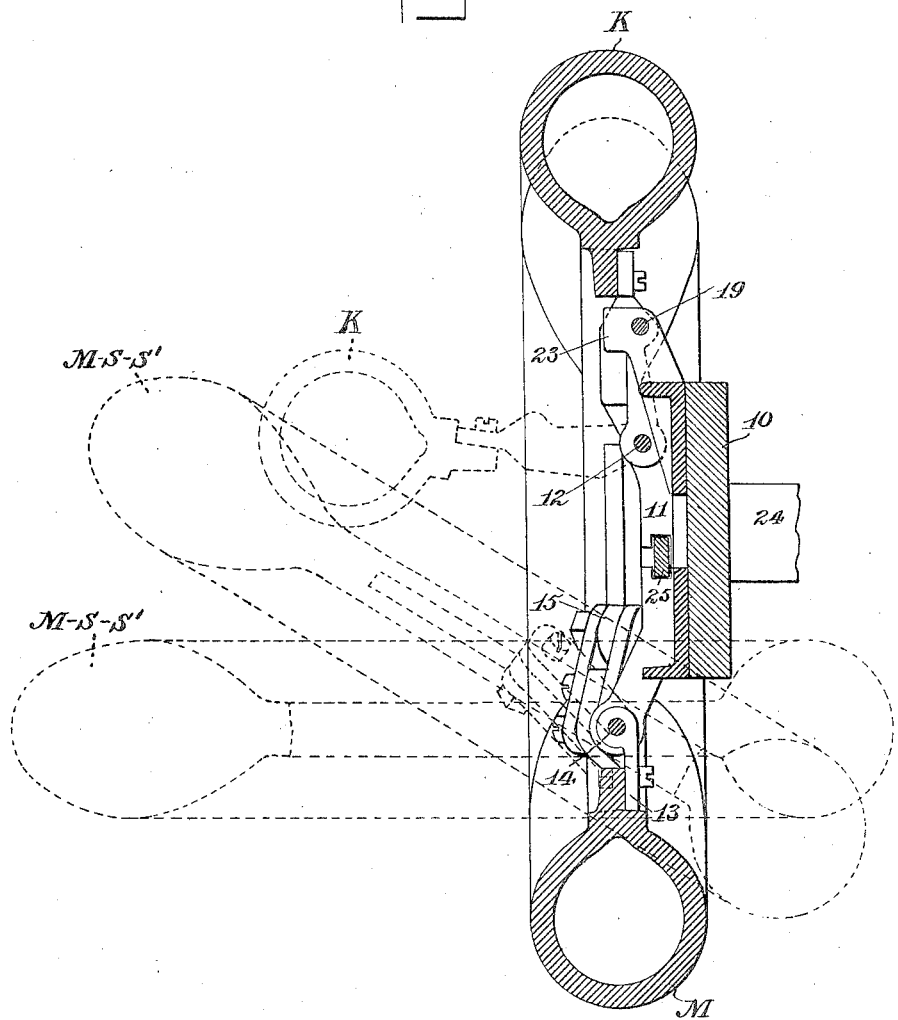
WITNESSES
INVENTOR
Peter DeMattia,
BY
ATTORNEYS Nov. 6, 1928.
P. DE MATTIA
COLLAPSIBLE CORE
Filed Oct. 16, 1924
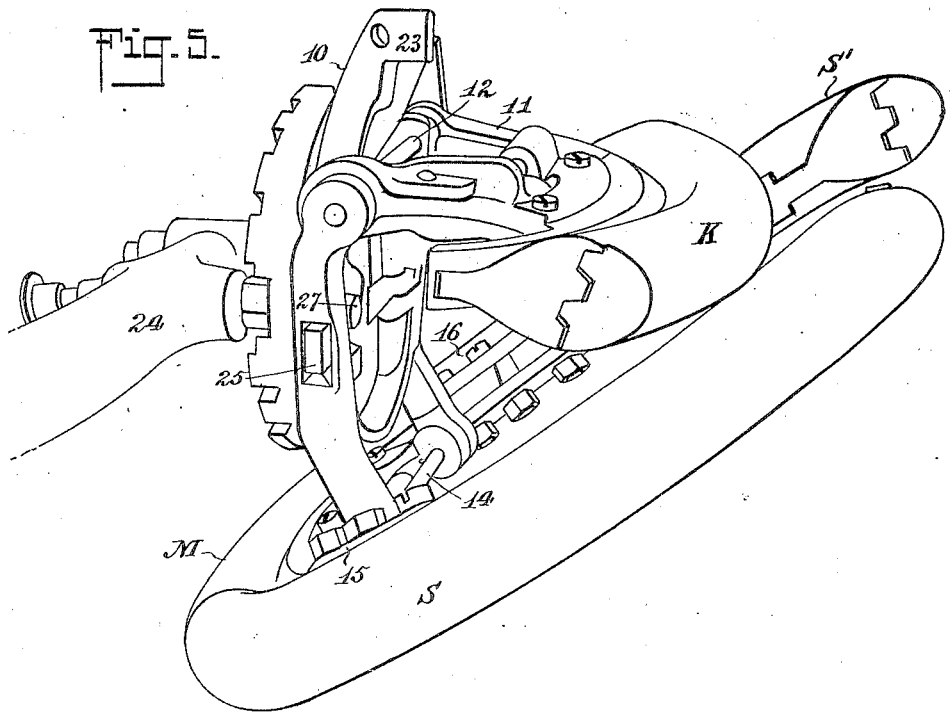
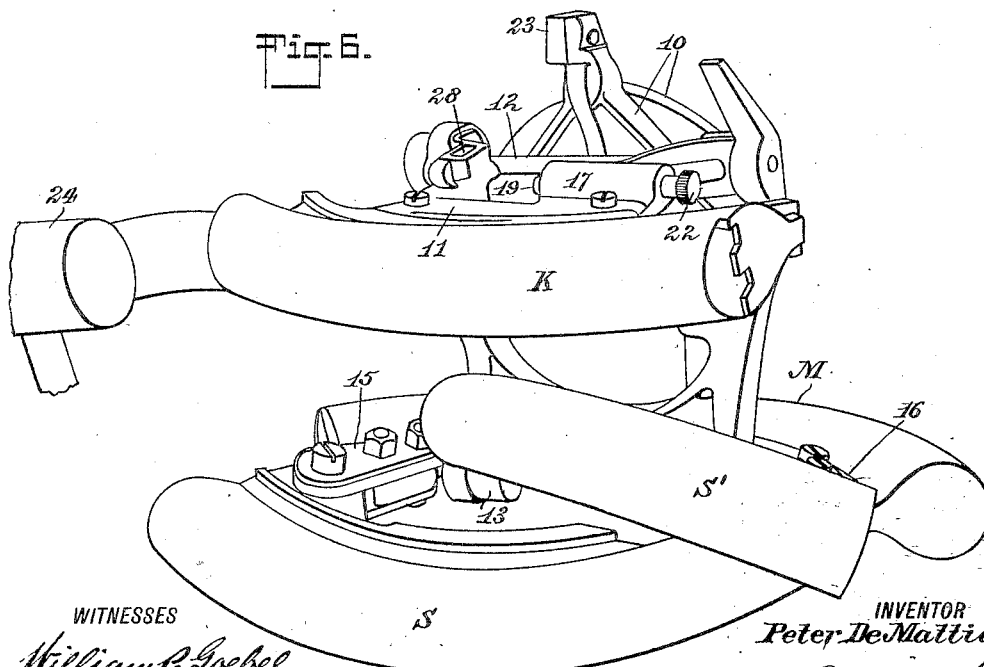

Patented Nov. 6, 1928.

1,690,623

UNITED STATES PATENT OFFICE.

PETER DE MATTIA, OF PASSAIC, NEW JERSEY, ASSIGNOR, BY MESNE ASSIGNMENTS, TO NATIONAL RUBBER MACHINERY COMPANY, OF AKRON, OHIO, A CORPORATION OF OHIO.

COLLAPSIBLE CORE.

Application filed October 16, 1924. Serial No. 744,046.

The prime object of the invention is to provide a collapsible core comprising a plurality of segmental sections mounted to move into and out of the plane of operative continuity and means to automatically move one of said sections into and out of a position of operative continuity upon movement of the core into and out of the plane of operative continuity.

A very important object of the invention is to provide a collapsible core including a key section and a plurality of auxiliary sections, all movable toward and away from the plane of operative continuity, and to provide means whereby, after building up a tire on the core, the tire may be seized, and pulled at an angle to the plane of operative continuity to swing the tire and core out of said plane, thereby to automatically withdraw the key section from the tire and then to move the tire and the other sections to a position where the latter sections may be relatively moved to render the shoe readily disengageable.

The invention will be more clearly understood, and various objects and advantages thereof additional to those above mentioned will be fully appreciated, from the following description when taken in connection with the accompanying drawings showing a construction as at present preferred.

In said drawings in which the plane of operative continuity of the entire core is assumed to be vertical, Figure 1 is a front elevation of the core as established for the forming of a tire shoe thereon, that is, with all the sections in the plane of operative continuity;

Fig. 3 shows in full lines the parts of Fig. 1 as viewed in axial vertical section—Fig. 3 also showing, in broken lines, the key section outswung as in Fig. 5, the auxiliary sections outswung as in Fig. 5, and the auxiliary sections outswung in Fig. 6, but before the secondary auxiliary sections are moved relative to the main auxiliary section as shown in said Fig. 6;

Fig. 4 is an enlarged fragmentary partial sectional view showing a detail of construction appearing in Fig. 1;

Figure 1:
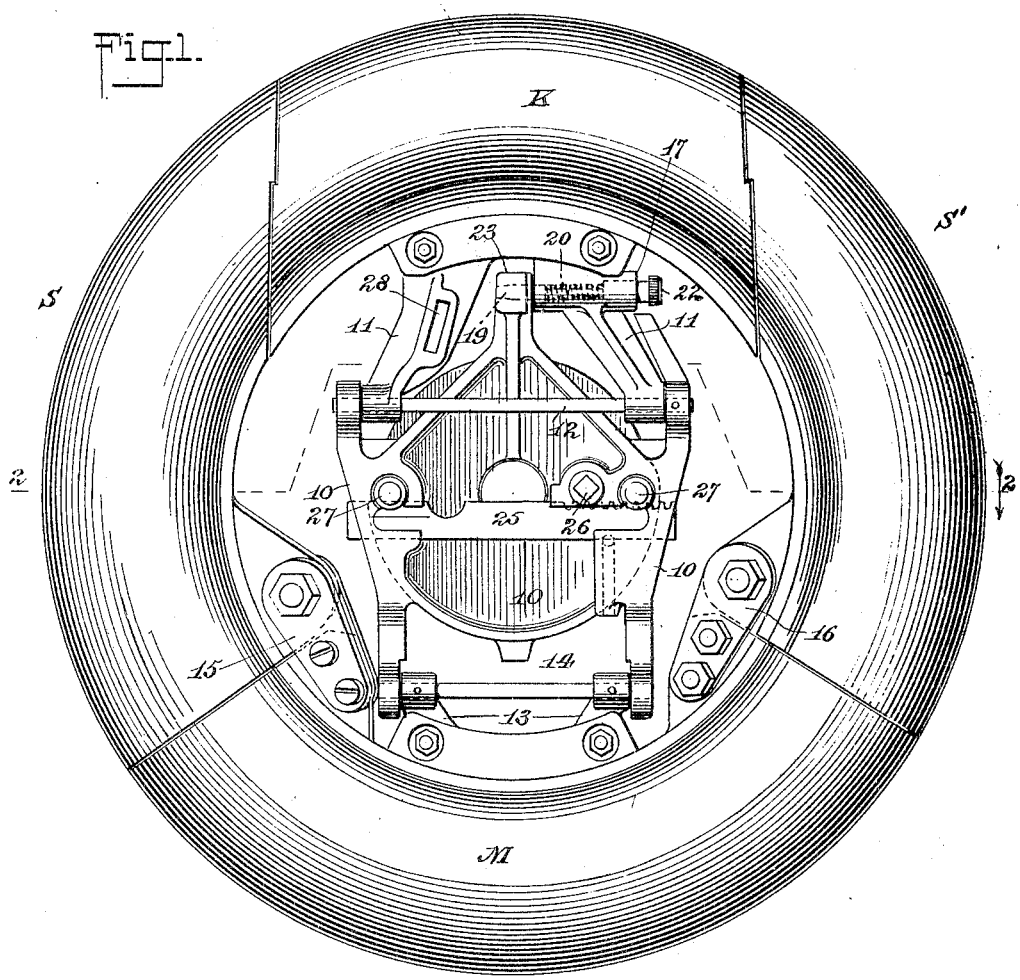

Fig. 5 is a perspective view showing the core partially collapsed, that is, the key section swung out from the plane of operative continuity and the auxiliary sections in course of being swung out as one unit into substantial parallelism with the outswung key section; and Fig. 6 is a view similar to Fig. 5, but showing the parts after finally moving the two secondary auxiliary sections toward the main auxiliary section following the swinging of all the auxiliary sections into a plane substantially parallel with the plane of the key section when disposed as in Fig. 5.

Similar reference characters refer to similar parts throughout the several views of the drawings.

Referring to the drawings more in detail, the core proper comprises a total complement of four sections, of which the section K is the key section, the section M is the main auxiliary section, and the sections S and S' are the secondary auxiliary sections.

Key section K is movable toward and away from the plane of operative continuity. This key section is pivotally connected to a support 10 for all the sections by being secured to a carrier 11 pivotally mounted on the axis of a horizontal shaft 12 on support 10.

The three auxiliary sections M, S and S' are also movable toward and away from the plane of operative continuity, and as one unit. These three sections are all swingably connected to the common support 10 for all the sections, by virtue of the fact that main auxiliary section M is secured to a carrier 13 pivotally movable on the axis of a horizontal shaft 14 on support 10 and of the fact that secondary auxiliary section S is pivotally connected, as at 15, to one end of main auxiliary section M, and secondary auxiliary section S' is pivotally connected as at 16, to the other end of said section M.

Shafts 12 and 14, constituting the pivotal axes for the two carriers 11 and 13, are parallel, but it will be noted that these shafts are so disposed above and below the axis of the plane of operative continuity of the sections that the section M on carrier 13 moves through an arc of swing of different radius than the arc of swing of key section K.

In order to maintain all the sections in the plane of operative continuity as shown in Fig. 1, as during the building up of a tire shoe, means are provided for locking the carrier 11 in proper position on support 10.

As to the means for thus locking the carrier 11, and referring particularly to Figs. 1, 3 and 4, one of the two upwardly converging legs or arms which comprise carrier 11 is provided with a lateral enlargement 17 bored out to constitute a barrel marked 18 in Fig. 4 for the accommodation of the reduced shank of a slide-latch and also for the accommodation of an expansile coil spring 20 encircling said shank. As shown best in Fig. 4, said spring acts at one end against the latch, or rather latch-head, and at its other end against a collar 21 forced into the outer end of the barrel; while the latch shank carries at its end protruded beyond the barrel and collar, a knurled finger piece 22 whereby the latch-head 19 may be pulled to the right of Fig. 4. With the parts arranged as in Fig. 1, the latch-head 19 is entered into a keeper socket formed in an enlargement 23 carried by main support 10.

Main support 10 is mounted on the usual jack or standard, indicated at 24 in Fig. 5, by a familiar type of rack-carrying lock bar marked 25 in Figs. 1, 3 and 5, in a manner which will be understood; the bar 25 being endwisely moved by applying a suitable tool to the squared end of a stub shaft marked 26 in Fig. 1 and carrying a pinion (not shown) engaging the rack teeth on the bar. When the main support 10 is mounted on the jack or standard 24, the parts just described are arranged as shown in Fig. 1, that is, side edge portions of the bar 25 are lodged in peripheral grooves carried by a pair of mounting pins 27 horizontally offset from the upper end of the jack and extended through transverse circular openings in support 10.

Figure 2:
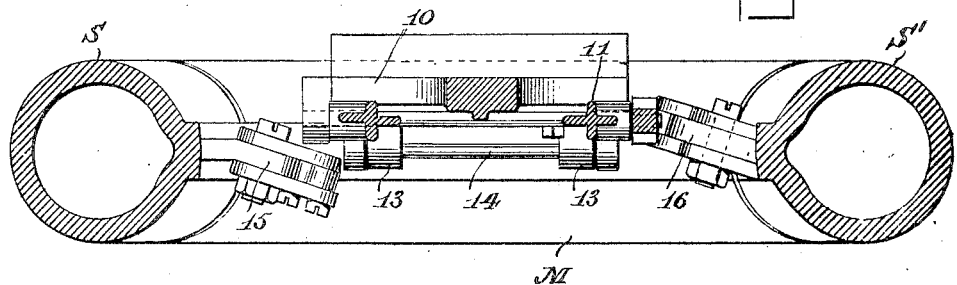
Fig. 2 is a horizontal section taken on line 2—2 of Fig. 1.

It will be seen, perhaps more clearly from Fig. 2, that the pivotal connections 15 and 16 whereby the secondary auxiliary sections S and S' are movably carried by main auxiliary section M, are characterized by axes, both of which are obliquely inclined relative to the plane of arcuate continuity of the three sections M, S and S', but that such axes are differentially inclined in a sense, while substantially parallel, one is so located as to cause one of the secondary auxiliary sections to swing toward the top of the main auxiliary section, while the other is so located as to cause its secondary auxiliary section to swing toward the bottom of the main auxiliary section. The result obtained by this feature of the invention is shown clearly in Fig. 6.

*Operation.*

Assuming a tire to have been formed on the core, with the sections arranged as shown in Fig. 1, so that such tire should now be removed from the apparatus, the first thing to do is to unlock the carrier 11 from main support 10, that is, to pull or push the knurled finger piece 22 to the right of Fig. 1. This may be done manually; but it is preferred to utilize a special L-shaped tool (not shown), by inserting one end in the square pocket 28 provided in a rigidifying webbing formed on one of the arms constituting carrier 11 and by latching the other end of the tool under the finger piece 22 when the latter is moved to the right.

Thereupon the tire is seized, say manually, at a point where the tire lies over the far side portion of key section K, as seen in Fig. 1. Then, one quick pull on the tire as thus held, is effective, not only to swing the auxiliary sections M, S and S', as one unit about the axis of shaft 14, but to swing the key section K about the axis of shaft 12—some time before the various sections reaching the dispositions shown in Fig. 5, the key section having automatically cleared the tire. The tire is continued to be pulled in the same direction, however, until the secondary sections of the tire are all disposed in a plane substantially away from the key section. Finally, the secondary auxiliary sections S and S' are swung relative to the main auxiliary section M until said sections S and S' are disposed as shown in Fig. 6; whereupon the tire may be easily removed and with the minimum of distortion.

In expanding the core, that is, in restoring the segmental core sections to the position of operative continuity in the plane of operative continuity, the interlocking teeth and recesses partially carried by the key section K and the secondary auxiliary sections S and S' as clearly shown in Fig. 5, re-engage when the carriers 10 and 11 attain a predetermined degree of mutual divergence in expanding the core, with the same facility with which such teeth and recesses disengaged when the two carriers assumed a similar divergence in collapsing the core. The simple and highly efficient locking means thus provided will be understood clearly when it is pointed out that, due to the shapes of the two carriers and the relative locations of their pivotal axes, the key section K and the sections S and S' on the carrier 10 traverse arcuate paths defining intersecting cylinders during swingings of the carriers 10 and 11 in collapsing and expanding the core, the teeth on sections K and S and S' at a certain instant attain positions where each tooth on one of said sections is just clear of but opposite its receiving recess on another of said sections.

It is pointed out that the pivotal axes of the two carriers 10 and 11 are on opposite sides of the axis of the core, are also different distances away from the plane of operative continuity, that is, are opposite different points along the axis of the core, and are different radial distances from said axis.

It is further pointed out that the section M may be considered to be a fixed section, and so designated. Said section is fixed in the sense that it is fixed relative to the position of operative continuity of the core, although of course movable relative to the plane of operative continuity of the core.

It will thus be seen that the construction hereinabove described provides a segmental core which may be swung as a whole out of the plane of operative continuity and by that very action cause a preliminary collapsing movement of the core.

I claim:

1. A collapsible core comprising a plurality of sections which are mounted to move into and out of the plane of operative continuity, a key section, and means to automatically move the key section out of the position of operative continuity upon swinging the plurality of sections out of the plane of operative continuity.

2. A collapsible core comprising a plurality of segmental sections, and means for automatically producing a radially relative movement of one section upon swinging the remaining sections from the plane of operative continuity.

3. A collapsible core comprising a plurality of segmental sections operable in continuity in the plane of operative continuity of the core, said sections being arranged to swing from the plane of operative continuity, a key section, and means responsive to said swinging movement for withdrawing the key section from the position of operative continuity.

4. A collapsible core consisting of a plurality of swingable segmental sections, a majority of said sections being mounted to swing into and out of the plane of operative continuity as one unit.

5. A collapsible core composed of a plurality of swingable segmental sections, all of said sections being relatively movable, certain of said sections constituting a segment and representing a majority of the circumference of the core being mounted to swing into and out of the plane of operative continuity as one unit.

6. A collapsible core comprising a plurality of segmental sections, the alternate sections constituting pairs, one such pair movable about a common pivot, and the other pair swingably mounted upon pivots having parallel axes.

7. A collapsible core comprising a plurality of segmental sections, one of which is fixed relative to the position of operative continuity and all of which are swingable relative to the plane of operative continuity.

8. A collapsible core comprising a plurality of opposed sections, each section movable into and out of the plane of operative continuity, and a plurality of sections pivoted to opposite ends of one of said opposed sections.

9. A collapsible core comprising a plurality of segmental sections, one of which is fixed relative to the position of operative continuity, and another of which is pivoted to the fixed section for swinging out of the arc-plane of said fixed section, said fixed section being swingable out of the plane of operative continuity, thereby to permit said pivoted section to have a compound pivotal action.

10. A collapsible core comprising a plurality of sections movable into and out of the plane of operative continuity thereof, mountings for said sections whereon the entire core formed of said sections may be swung out of said plane, and means for causing one of said sections to be automatically disengaged from the remaining sections during such swinging movement.

11. A collapsible core composed of a plurality of sections all swingable into and out of the plane of operative continuity, and independent carriers, one for the key section and the other for the remaining sections.

12. A collapsible core consisting of a plurality of segmental sections movable into and out of the plane of operative continuity, said sections including a key section, a pivot whereon the key section may be swung through a path of one radius, and a pivot whereon the remaining sections may be swung as a unit through a path of a different radius.

13. A collapsible core consisting of a plurality of segmental sections movable into and out of the plane of operative continuity, said sections including a key section, pivots whereon the key section and the remaining sections may be swung through different paths, and means for stopping the swinging of the key sections before the remaining sections have completed their swinging, in collapsing the core.

14. A collapsible core comprising a plurality of segmental sections capable of alignment in a certain plane to form an annulus, a common pivot for certain of the sections, and means operable responsive to the movement of the said sections about said pivot for destroying said annular form.

15. A collapsible core comprising a plurality of sections mounted to move as a unit into and out of the plane of operative continuity; a key section; and means to automatically move said key section out of operative continuity and simultaneously out of the plane of operative continuity, when the other sections are moved as a unit out of the plane of operative continuity.

16. A collapsible core comprising a plurality of sections, said sections being mounted to move as a unit into and out of the plane of operative continuity, a key section, and means responsive to the movement of the mounted sections into and out of the plane of operative continuity to automatically move the key section into and out of operative continuity and simultaneously into and out of the plane of operative continuity.

17. In a collapsible core construction a core body composed of a group of sections and a key section operable in continuity in the plane of operative continuity of said core, said group being pivoted to move into and out of the plane of operative continuity upon the mere swinging thereof, and means to initiate the withdrawal of the key section from the core body when the group of sections is moved out of the plane of operative continuity.

18. In a collapsible core construction a core body composed of a plurality of relatively movable sections operable in continuity in the plane of operative continuity of said core; a pivot whereon, in collapsing the core certain sections thereof may be swung; and means responsive to said swinging movement for moving another section from operative continuity with the remaining sections of the core.

19. In a collapsible core construction a core body composed of a plurality of relatively movable sections operable in continuity in the plane of operative continuity of said core; a pivot whereon, in collapsing the core certain sections thereof may be swung; and means responsive to said swinging movement for moving one section from the position and plane of operative continuity into a different position and a different plane.

20. In a collapsible core construction a core body composed of a main section, one or more auxiliary sections, and a key section, operable in continuity in the plane of operative continuity of said core; a pivot whereon in collapsing the core the main section may be swung; means responsive to said collapsing movement for moving the key section from the position and plane of operative continuity into a different position and a different plane; and an inclined pivotal connection between the main section and the auxiliary section or sections whereon the latter may be swung to complete the collapsing movement of the core.

21. In a collapsible core construction a core body composed of a main section, one or more auxiliary sections, a key section and a support for the core body, all cooperating in the plane of operative continuity of said core; a pivotal connection between the main section and the support; means for rendering said pivotal connection effective or ineffective as desired; and means responsive to the swinging of the main section upon the support, when said pivot is rendered effective, for removing the key section from cooperation with the remaining sections as well as from the plane of operative continuity.

22. In a collapsible core construction, a core body composed of a main section, one or more auxiliary sections, a key section and a support for the core body, all cooperating in the plane of operative continuity of said core; a pivotal connection between the main section and the support; means for rendering said pivotal connection effective or ineffective as desired; means responsive to the swinging of the main section upon the support, when said pivot is rendered effective, for removing the key section from cooperation with the remaining sections as well as from the plane of operative continuity; and pivotal connections between the main and auxiliary section or sections whereby the latter may be thereafter swung to complete the collapsing movement of the core.

23. A collapsible core comprising a main section and a key section, a support therefor, means for pivotally connecting the main section to the support, and means responsive to the movement of the main section about said pivot for causing the key section to be withdrawn from the core.

24. A collapsible core comprising a main section and a key section, a support therefor, means for pivotally connecting said sections to said support, and means responsive to the movement of the main section about said pivot for causing the key section to be withdrawn from the core.

25. A collapsible core comprising a main section and a key section, a support therefor, means for pivotally connecting said sections to said support, and means responsive to the movement of the main section about said pivot for causing the key section to move relative to both the main section and the support.

26. A collapsible core comprising a main section and a key section capable of co-ordination in the plane of operative continuity of the core, a pivot for the main section, and means responsive to the movement of the main section about said pivot for moving the key section relative to the main section.

27. A collapsible core comprising a main section and a key section capable of co-ordination in the plane of operative continuity of the core, a pivot for the main section, and means responsive to the movement of the main section about said pivot for moving the key section from its position of co-ordination and out of the plane of operative continuity.

28. A collapsible core comprising a plurality of sections including a main section and a key section, said sections normally positioned in the plane of operative continuity of said core, a pivot for the main section whereon it may be swung out of the plane of operative continuity, and means responsive to the movement of the main section about said pivot for moving the key section out of its normal position.

29. A collapsible core comprising a plurality of sections including a main section and a key section, said sections normally positioned in the plane of operative continuity of said core, a pivot for the main section whereon it may be swung out of the plane of operative continuity, and means responsive to the movement of the main section about said pivot for moving the key section out of its normal position and out of the plane of operative continuity.

30. A collapsible core comprising a plurality of sections including a main section and a key section, said sections normally positioned in the plane of operative continuity of said core, a support for the core, means for pivotally connecting the main section to said support, and means responsive to the movement of the main section about said pivot for causing the key section to be withdrawn from its normal position in the core.

31. A collapsible core comprising, a plurality of sections including a main section and a key section, said sections normally positioned in the plane of operative continuity of said core, a support for the core, means for pivotally connecting the main section of said support, and means responsive to the movement of the main section about said pivot for causing the key section to move relative to the position and the plane of operative continuity.

32. A collapsible core comprising movable sections, pivotal means supporting certain of said sections, and devices intermediate said pivot and an independently movable section to automatically effect the collapsing movement of said section upon the movement of the pivoted sections about their pivot.

33. In a collapsible core construction a core body comprising a plurality of sections operative in continuity in the plane of operative continuity of said core, a pivot whereon said sections may be turned as a unit out of the plane of operative continuity, a key section adapted when positioned in the plane of operative continuity to complete the core structure, and means responsive to the turning of the sections upon said pivot for withdrawing the key section from the completed core structure and for moving it out of the plane of operative continuity.

34. A collapsible core composed of a plurality of relatively movable segmental sections, a pivot for one of them, said sections being capable of co-ordination in a certain plane and susceptible of individual movements when said pivoted section is moved about its pivot to initiate the collapsing movement of the core.

35. In a collapsible core construction a plurality of pivots whereon the core may be swung, and means responsive to the movement of the core about said pivots for initiating relative movement of certain of the sections in initiating the collapsing movement of the core.

PETER DE MATTIA.